United States Patent [19]

Mohr et al.

[11] Patent Number: 4,772,408

[45] Date of Patent: Sep. 20, 1988

[54] SILICATE-CONTAINING ANTIFREEZE WITH PHOSPHONATE SILANE STABILIZER

[75] Inventors: Paul H. Mohr, Chappaqua; Enrico J. Pepe, Amawalk, both of N.Y.

[73] Assignee: First Brands Corporation, Danbury, Conn.

[21] Appl. No.: 47,183

[22] Filed: May 6, 1987

[51] Int. Cl.$^4$ ............................................. C09K 5/00
[52] U.S. Cl. ...................... 252/75; 252/78.3; 252/78.5; 528/30; 556/405
[58] Field of Search ............ 252/75, 78.3, 78.5; 556/405; 528/30

[56] References Cited

U.S. PATENT DOCUMENTS

| | | | |
|---|---|---|---|
| 2,843,615 | 7/1958 | Linville | 556/405 |
| 2,963,503 | 12/1960 | Marsden | 528/25 |
| 2,995,594 | 8/1961 | Fekete | 528/24 |
| 3,198,820 | 8/1965 | Pines et al. | 556/418 |
| 3,337,496 | 8/1967 | Pines et al. | 528/32 |
| 3,341,469 | 9/1967 | Pines et al. | 528/20 |
| 4,149,985 | 4/1979 | Wilson | 252/75 |
| 4,333,843 | 6/1982 | Wing et al. | 252/78.3 |
| 4,367,154 | 1/1983 | Jernigan | 252/78.3 |
| 4,370,255 | 1/1983 | Plueddemann | 252/78.3 |
| 4,629,602 | 12/1986 | Gousetis et al. | 252/78.3 |

Primary Examiner—Robert Wax
Attorney, Agent, or Firm—Gary L. Wamer

[57] ABSTRACT

A silicone/silicate containing antifreeze characterized by dilute aqueous stability includes phosphonate silanes characterized by the following formula:

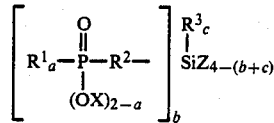

wherein a is 0 or 1, b is 1 or 2, c is 0 or 1, $R^1$ and $R^3$ are selected from the group consisting of hydrogen, monovalent hydrocarbon radicals and substituted monovalent hydrocarbon radicals, $R^2$ is a divalent hydrocarbon radical selected from the group consisting of alkylene, arylene and alicyclic radicals, Z is a hydrolyzable moiety attached to silicon, and X is a member selected from the group consisting of hydrogen, monovalent hydrocarbon radicals, substituted monovalent hydrocarbon radicals, and a monovalent cation, the phosphonate silane having an appropriate hydrophile/hydrophobe balance and being present in an amount sufficient to stabilize the silicate.

32 Claims, No Drawings

SILICATE-CONTAINING ANTIFREEZE WITH PHOSPHONATE SILANE STABILIZER

CROSS REFERENCE TO RELATED APPLICATIONS

Mohr and Pepe, co-pending U.S. application Ser. No. 855,380, filed Apr. 24, 1986, which application is a continuation-in-part of U.S. application Ser. No. 781,985, filed Sept. 30, 1985.

Zientek, co-pending Ser. No. 752,561, filed July 10, 1985, which application is a continuation-in-part of Ser. No. 633,208, filed July 23, 1984.

FIELD OF THE INVENTION

The present invention relates generally to an antifreeze concentrate and, more specifically, to an antifreeze composition containing silicate stabilized by selected phosphonate silanes.

BACKGROUND OF THE INVENTION

Corrosion-inhibitive heat transfer compositions of aqueous alcohol solutions heretofore have been widely employed in heat exchange systems associated with internal combustion engines, solar systems, and the like, to depress the freezing point of the coolant, to raise its boiling point, and provide corrosion inhibition. Since conventional alcohol-based heat transfer fluids, such as automobile antifreezes, have the tendency to corrode the metal (e.g., aluminum, copper, iron, brass and solder) surfaces of the heat transfer system, these fluids generally contain corrosion inhibitors to minimize this phenomenon.

Two United States patents are particularly noteworthy, as these are considered to be representative of the state-of-the-art antifreeze technology. U.S. Pat. Nos. 3,341,469 and 3,337,496 thus disclose an aqueous alcohol composition employing organosiloxane/silicate copolymers wherein the siloxane can contain polyethyleneoxy organosilicon species. As an additional illustration, U.S. Pat. No. 3,198,820 discloses an aqueous alcohol antifreeze containing a carboxyl organosiloxane/silicate copolymer.

Corrosion-inhibitive heat transfer compositions of the type described in the '469 and '496 patents have enjoyed wide usage. A composition of this type typically has superior shelf-life, does not attack rubber parts in cooling systems, is characterized by low levels of foam formation, and is useful over a wide temperature range even after prolonged periods in service.

In addition to providing corrosion protection for cooling system metals, the art has recognized the need to provide an antifreeze which does not gel in concentrate form. Thus, U.S. Pat. No. 4,149,985 teaches that the pH at the time of silicate addition to such antifreeze concentrates must be between 9.5 and 10 5 (providing a final concentrate pH of about 11) in order to minimize concentrate silicate stability problems during storage. Unfortunately, these antifreeze concentrates are subject to annoying gelation problems from time to time, although these antifreezes afford reasonable latitude in preparation and use.

Many prior patents in this field, e.g., the '469, '496, '985 and '820 patents identified herein, suggest that an extremely large number of silanes are useful to form stable polymers with inorganic silicates which, in ethylene glycol concentrates, are not subject to gelation and the manufacturing and dispensing problems associated with gel formation. These prior patents likewise suggest that the pH range may vary widely, typical ranges disclosed being from 7.0 up to 12.0 or so.

Prior work in this field also suggests that relatively large amounts of silicates (as much as 5,000 ppm of Si) can be appropriately stabilized. However, it has been found that these prior art suggestions are not particularly useful in predicting the suitability of silanes for generating effective silicate species in aqueous antifreezes.

Pursuant to the invention disclosed in commonly-assigned U.S. application Ser. No. 752,561, it has been found that relatively low pH antifreezes of less than about 10, having concentrate pHs of between about 5.8 and about 7.5, impart highly effective protection against aluminum corrosion in comparison to state-of-the-art antifreezes and are silicate gel resistant in the concentrate when using selected silanes.

Still other prior work in this field is reflected in British Pat. No. 2,018,266A and U.S. Pat. Nos. 4,333,843, and 4,386,154. In general, this prior work suggests the use of a wide variety of siliconate/phosphonate compounds as stabilizers against gel formation of silicates in an antifreeze. The use of the alkali metal and tetraalkyl ammonium derivatives is also disclosed.

In addition to the foregoing, the prior art is replete with attempts to provide antifreeze formulations which are gel resistant and impart the desired protection for engine cooling systems. The essentially uniform focus, applicants believe, has been on the ability of the antifreeze formulation in the concentrate to avoid undue gelling. Yet, it is state-of-the-art practice for antifreeze manufacturers to recommend that antifreeze concentrates be diluted with water to provide a 50 volume percent working antifreeze (viz.—the antifreeze concentrate being diluted with an equal volume of water).

As discussed in commonly assigned application, Ser. No. 855,380, it has been found that many silicone stabilizers that are satisfactory in providing stability in an antifreeze concentrate appear to destabilize the silicate in the water-diluted or working antifreeze, causing a portion of the silicate corrosion inhibitor to form an insoluble species in solution. At the very least, this will result in a loss of corrosion inhibition efficiency which could well be substantial. This is considered to be a rather surprising discovery in light of the extensive prior efforts in this field.

This destabilization, upon dilution to provide a working antifreeze, thus presents a serious obstacle which must be overcome. Stability of the antifreeze composition in concentrate form provides no assurance that the concentrate, upon dilution with water to yield the working antifreeze, will retain the desired corrosion protection intended with a silicate antifreeze formulation. In addition to the potential loss of corrosion protection, destabilization may well result in silicate precipitation, causing blockage of the radiator tubes in an automobile cooling system.

Still further, it would be highly desirable to provide an antifreeze that is capable of retaining adequate stability, yet which allows greater latitude in formulation. For example, an antifreeze with a higher RA (i.e.—reserve alkalinity) is often desirable. This also allows maintenance of the desired working pH for a longer period of time. Yet, such a high RA composition generally tends to lessen the desired silicate stability. Similarly, it is often desirable to incorporate supplemental corrosion inhibitors, many of which are ionic in nature, yet the presence of ionic supplemental corrosion inhibitors likewise tends to exacerbate the silicate stability problem.

Still further, U.S. Pat. No. 4,367,154 discloses that the shelf life or gelation resistance of single phase glycol or glycol ester compositions containing alkali metal silicates can be improved by the addition to the glycol compositions one of the following groups of silanes:

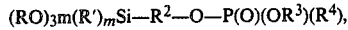

$(RO)_3m(R')_mSi-R^2-O-P(O)(OR^3)(R^4)$,

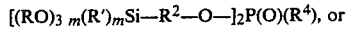

$[(RO)_{3\,m}(R')_mSi-R^2-O-]_2P(O)(R^4)$, or mixtures of I and II,
wherein m is 0-2
R, $R^3$, $R^4$ are alkyl groups of 1-4 carbons,
R' is an alkyl group of 1-4 carbons, phenyl, and aralkyl group of 7-10 carbons, and
$R^2$ is an alkylene group of 1-4 carbons.

Typically, the methyl derivative of these materials which is produced as a precursor has the following structure:

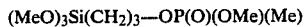

$(MeO)_3Si(CH_2)_3-OP(O)(OMe)(Me)$

This methyl ester precursor of these phosphorous modified silanes, however, is not soluble in ethylene glycol unless it has been partially saponified with an alkali metal salt such as sodium hydroxide. U.S. Pat. No. 4,370,255 is concerned with the saponified products. Such products are prepared by taking the silylalkylester of phosphorus, treating with the appropriate alkali metal hydroxide such as sodium hydroxide and then refluxing for several hours to saponify the phosphonate silane precursor.

However, it has been found that saponification of such phosphorous modified silanes can result in problems. Thus, when the degree of phosphonate ester group saponification which is desired is carried out, such saponification can result in the silane ester to phosphorous group being hydrolyzed, producing a silane species which is much less effective as a silicate stabilizer. This lack of hydrolytic stability is highly undesirable. Moreover, the degree of saponification that will actually be achieved using the same saponification conditions can vary, perhaps significantly, as can the by-products. This set of circumstances is, of course, less than desirable for a highly reliable and reproducible commercial process.

It would be desirable to be able to provide hydrolytically stable phosphonate silanes capable of imparting adequate stabilization in the antifreeze concentrate and also generate effective silicate species in the aqueous antifreeze.

OBJECTS OF THE INVENTION

It is a principal object of the present invention to provide a silicate-containing antifreeze that is stable in concentrate form, yet, upon dilution with water, is characterized by exceptional silicate stability in the diluted antifreeze composition.

Yet another and related object of this invention is to provide an antifreeze which, upon dilution with water, provides highly effective and efficient protection for internal combustion engine cooling systems.

A still further object of the present invention is to provide a stable antifreeze concentrate which maintains its stability when diluted with water.

Another object of this invention provides an antifreeze which retains the desired stability while allowing substantial latitude in formulation.

These and other objects will become apparent in view of the following detailed description.

SUMMARY OF THE INVENTION

In general, the present invention relates to an antifreeze composition comprising: (a) an alcohol, (b) a buffer in an amount sufficient to maintain a pH in the desired range for the working antifreeze, (c) a silicate in a corrosion-inhibiting effective amount, and (d) a phosphonate silane or silicone present in an amount effective to stabilize the silicate component. More particularly, and pursuant to the present invention, it has been discovered that the utilization of certain phosphonate silanes having an appropriate hydrophilic (glycophilic)-/hydrophobic (glycophobic) balance (hereinafter referred to as the "hydrophile/hydrophobe balance") will result in desirable stability for the silicate in both an antifreeze concentrate and in the working antifreeze.

These phosphonate silanes will have the requisite solubility in the antifreeze concentrate and working antifreeze and can be prepared from precursors that are hydrolytically stable upon undergoing saponification as will be discussed herein. The appropriate hydrophile/hydrophobe balance is achieved by coordinating the degree of saponification with the overall molecular architecture of the phosphonate silane. This coordination will be described later in this specification.

These phosphonate silanes may be characterized by the following formula:

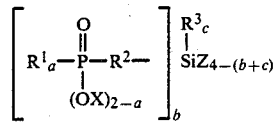

$$\left[ R^1_a - \overset{O}{\underset{(OX)_{2-a}}{\overset{\|}{P}}} - R^2 - \right]_b \overset{R^3_c}{\underset{}{\overset{|}{Si}Z_{4-(b+c)}}}$$

wherein $R^1$ and $R^3$ are hydrogen, a monovalent hydrocarbon radical such as methyl or the like or a substituted hydrocarbon radical; $R^2$ is a divalent hydrocarbon radical such as, for example, an alkylene group; X is any of the moieties identified for $R^1$ and $R^3$ or a monovalent cation such as potassium; Z represents hydroxyl or a moiety hydrolyzable to silanol; a has a value of 0 or 1; -b has a value of 1 or 2; and c has a value of 0 or 1. As is apparent from the foregoing, the moieties are selected to provide an appropriate hydrophile/hydrophobe balance.

The resulting antifreeze composition (concentrate) is readily soluble in water to provide a working antifreeze. Moreover, upon dilution to provide the working antifreeze, the resulting composition should provide enhanced and efficient corrosion protection in an engine cooling system inasmuch as the amount of silicate available to provide such corrosion protection can be optimized.

The more specific aspects of the present invention and the particularly preferred embodiments will be described in the detailed description.

DETAILED DESCRIPTION OF THE INVENTION

Alcohol Component

The alcohol component may be any of the many useful species known in the art for formulating antifreeze concentrates. Representative useful alcohols include methanol, ethanol, propanol, butanol, ethylene glycol, diethylene glycol, propylene glycol, dipropylene glycol, glycerol, butylene glycol, the monoethylether of glycerol, the dimethyl ether of glycerol, alkoxy alkanols (such as methoxyethanol), and mixtures thereof. The preferred alcohol is selected from the group consisting of ethylene glycol, diethylene glycol, propylene glycol, dipropylene glycol and mixtures thereof.

Buffer

As was the case with the alcohol component, useful buffers may be any of the many that are known and have been described in the antifreeze concentrate field. The particular buffer or mixtures of buffers used, as is known, will depend upon the pH desired for the working antifreeze which, in turn, may be influenced by the particular metals used in the engine cooling system.

When measured on a 50:50 volume/volume of antifreeze concentrate and water (the general composition recommended for a working antifreeze), the pH will generally be maintained between a level of about 8 and about 11. Below a pH of about 8, the antifreeze would generally be expected to be unduly corrosive to ferrous metals. On the other hand, utilizing a working pH of more than about 11 would be expected to generally promote unacceptably high levels of aluminum corrosion and aluminum transport deposits.

In accordance with the present invention, it is preferred, when utilizing the 50:50 volume to volume mixture, to employ a pH within the range of from about 9 to about 11, more preferably between about 9 and about 10.5. However, when optimizing the system to favor minimized corrosiveness toward amphoteric metals and to minimize aluminum transport deposition in a cooling system including such metals, a pH within the range of from about 8 to about 10.5 will be preferred.

Representative examples of suitable buffers include ammonium, alkanolamine and alkali metal borates, tetraalkyl and tetraaryl-ammonium borates and borate mixtures thereof; alkali metal phosphates; ammonium phosphates, alkanolamine phosphates, and tetraalkyl- and tetraaryl-ammonium phosphates, and phosphate mixtures thereof; alkali metal, ammonium, and amine, benzoates and substituted benzoates; salts of the dibasic acids, such as sebacic and azelaic acids, having 6 to 20 carbons, and mixtures thereof; and mixtures of any of the above buffers; said buffer generally being present in an amount of between 1 and about 5 wt. percent, based on the weight of the concentrate When aluminum transport deposition is of concern, a borate or a mixture of borates is the preferred buffer and may be conveniently added as the alkali metal salt. After adding the salt, addition of sodium hydroxide or a mixture of boric acid and sodium hydroxide can be used to provide the desired metaborates and/or tetraborates in the concentrate.

The buffer provides the desired use or working pH and capacity for maintaining this pH during extended use of the antifreeze when the pH would otherwise change due to changes in the compositions of the antifreeze over time. These functions are also achieved using soluble phosphate salts of non-alkali metals such as ammonium phosphate and alkanolamine phosphate and the other organic acid derivatives mentioned above. However, these amine phosphates are less preferred than the alkali metal borates since the former tend to promote the corrosion of cuprous metals.

Silicate Component

Any silicate known for use in antifreeze concentrates may be employed as the silicate component. A variety of useful inorganic and organic silicates are thus known.

Useful inorganic silicates are represented by units having the empirical formula:

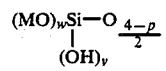

where M is a monovalent cation that forms a glycol soluble silicate selected from the group consisting of sodium, potassium, lithium, rubidium and tetraorganoammonium cations, w has a value of from 1 to 4 inclusive, v has a value from 0 to 3 inclusive and p has a value from 1 to 4 inclusive which is equal to the sum of w and v.

Useful organic silicates are the esters encompassed by the formula:

wherein R is selected from the group consisting of alkyl, aryl, alkoxyalkyl, alkoxyaryl, hydroxyalkoxy, and mixtures thereof. In use, when diluted with water, it is believed that such esters in a relatively low pH range will form smaller silicate aggregates, which in turn have a greater proficiency in inhibition of metal corrosion as compared to the inorganic silicates.

Further, with respect to such organic silicates, as is known, any R group selected should not sterically hinder the silicate such that hydrolysis to the silanol cannot be effected. Similarly, an R group should not be employed which will cause the silicate to be insoluble in the alcohol used for the antifreeze.

As illustrative examples of useful inorganic silicates, potassium and sodium silicates are appropriate. Useful organic silicate esters include: alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol derived silicates such as hydroxyethyl silicate and hydroxypropyl silicate; and polyhydroxy alkyl silicates such as glycerol silicate and pentaaerythritol silicate; oxyalkylene silicates such as methoxy diethylene glycol silicate, i.e. METHYL CARBITOL ® silicate; and mixtures of the above. The preferred organic silicate is tetra-hydroxyethyl orthosilicate. Also useful within the scope of the present invention is the well-known class of partially condensed orthosilicate esters.

The amount of silicate in the concentrates used to make the antifreezes of this invention can vary over a wide range, but is preferably present in an amount of between 40 and 1000 ppm of equivalent Si, preferably at least about 100 ppm, and more preferably in an amount between 300 and 700 ppm. Below 40 ppm, insufficient silicate would generally be provided to minimize metal corrosion in the automobile cooling system, whereas above 1000 ppm, silicate gels may be encountered in the antifreeze concentrate and in the working antifreeze.

It should be appreciated that the level of silicate employed will depend somewhat upon the operating pH range. Thus, the maximum silicate level for the lower pH ranges will preferably be no more than about 700 ppm of equivalent Si to minimize undesirable silicate gels.

Phosphonate Silanes

As previously discussed, and pursuant to a principal aspect of the present invention, this component may be characterized by the following formula:

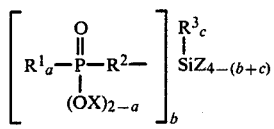

The particular moieties selected must, as previously noted, be coordinated to insure that the overall molecular architecture is such that an appropriate hydrophile-/hydrophobe balance is provided. The means by which this appropriate balance is achieved will be discussed later in this section following the general discussion of the structural formula and the synthetic techniques that may be utilized to prepare the silanes.

With this as background, any of a wide variety of monovalent hydrocarbon groups or hydrogen may be used for the $R^1$ and $R^3$ constituents. As illustrative examples, there may be identified methyl, ethyl, phenyl or the like or even substituted monovalent hydrocarbon radicals. The principal functional requirement is that the group selected should not render either the silane, its hydrolyzate, or the silicone/silicate copolymer insoluble. Accordingly, relatively large alkyl chains and the like should generally be avoided.

The $R^2$ constituent should be a divalent hydrocarbon radical such as an alkylene, arylene radical, or a divalent alicyclic moiety. The particular moiety employed may well depend upon the relative efficacy of the preparative techniques available. In this regard, it will generally be more practical to utilize as the $R^2$ group an alkylene radical. For this reason, and as will be more fully discussed in conjunction with the synthetic techniques, the currently more practical species will utilize either $(CH_2)_2$ or $(CH_2)_3$. However, an alkylene group having from 1 to about 24 carbon atoms, even up to about 36 carbon atoms or more, may be employed. Further, and importantly, the chain length or the relative bulkiness of the $R^2$ group must be tailored to the architecture of the entire molecule, as will be discussed in more detail hereinafter.

With respect to the X constituent, this may be any of the several moieties identified for $R^1$ and $R^3$ or a monovalent cation. Any of a variety of monovalent cations may be utilized. The principal functional requirements are that solubility of the overall molecule be provided and that the constituent selected be, of course, ionizable. Illustrative useful examples include sodium, potassium, lithium, rubidium, and tetraorganoammonium cations such as tetramethylammonium and the like, with sodium and potassium being preferred.

The hydrolyzable moiety Z can include any hydrolyzable moiety attached to silicon, such as, for example, halogens, such as F, Cl, Br, and I; hydrogen; hydrocarbonoxy, such as $-OCH_3$, $-OCH_2CH_3$, $-OCH_2CH_2OH$, $-OCH_2CH_2O-$, $-O(CH_2CH_2O)_2H$, $-O(CH_2CH_2O)_7CH_3$ oximato

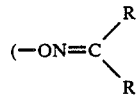

in which R is a monovalent hydrocarbon radical such as methyl or ethyl), organoamino

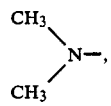

acylamide

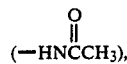

and haloalkoxy, such as, chloroisopropoxy

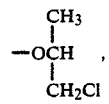

and hydroxyl (—OH).

The broad useful class of moiety Z would include, for example, acyloxy containing species, alkyloxy containing species, aryloxy containing species, aralkyloxy containing species, alkaryloxy containing species, alkyleneoxy containing species, hydroxy alkyloxy containing species, hydroxy polyalkyleneoxy alkyloxy containing species, alkoxy polyalkyleneoxy alkyloxy containing species, alkoxy alkyloxy containing species, amino alkyloxy containing species, dialkylamino alkyloxy containing species, alkanolamino alkyloxy containing species, and dialkanolamino alkyloxy containing species.

It is also useful for the hydrolyzable group, Z, to be a silylphosphonate hydrolyzable group, e.g.—

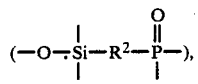

with $R^2$ being as previously described in the general formula. This could occur inherently in the synthesis of the phosphonate silane. Stated differently, X in the general formula could also comprise

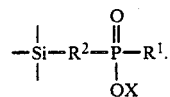

Thus, there is substantial breadth in selecting the hydrolyzable group, Z. The principal requirement is that the particular group selected not prevent the phosphonate silane from being soluble in the antifreeze concentrate.

In the general formula for the phosphonate silanes utilized in the present invention, a has a value of 0 or 1; b has a value of 1 or 2; and c has a value of 0 or 1. However, it will be generally more desirable from both the synthesis and performance standpoint to have a be either 0 or 1, b have a value of 1 and c be 0. In these instances, the hydrolyzable moiety, Z will result in the overall silane having 3 silanol groups which is more advantageous for reaction with the silicate in forming the desired silicone/silicate copolymer.

The synthesis of these phosphonate silanes may be carried out by using known techniques. For example, the synthetic techniques set forth in U.S. Pat. Nos. 2,963,503 and 2,995,594 may be utilized. In general, among the more useful olefinic alkoxysilane (particularly the trialkoxysilanes) intermediates are the following: aliphatics such as the vinyl, hexenyl and butenyl silanes and alicyclics such as bicycloheptenyl, bicycloheptenylethyl and cyclohexenylethyl silanes.

Additionally, the synthetic techniques described in U.S. Pat. No. 4,629,602 (see Columns 2 and 3) may be used to prepare various useful phosphonate silanes. One of the reactions to which reference is made therein may be summarized as follows:

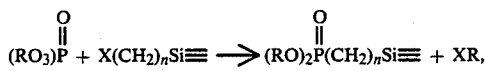

$(RO_3)P + X(CH_2)_nSi\equiv \longrightarrow (RO)_2P(CH_2)_nSi\equiv + XR,$

X being a halogen and n being other than 2.

The selection of the starting material can likewise be employed to provide useful phosphonate silanes other than the diesters described in the above formula. Thus, utilization of

$RP(OR)_2$ as a starting material will provide a phosphonate silane according to the general formula wherein a is 1.

Based upon currently commercially available intermediates, the phosphonate silanes according to the general formula that should be capable of being most economically prepared are the family of phosphonate silanes in which $R^2$ is either $(CH_2)_2$ or $(CH_2)_3$. Accordingly, from the economic standpoint, these materials are preferred even though, as will be discussed hereinafter, the performance resulting from their usage may not provide the optimum benefits achievable with the present invention. Particularly preferred species of these families are:

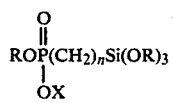

$ROP(CH_2)_nSi(OR)_3$
$|$
$OX$ wherein n is 2 or 3, the R groups are methyl or ethyl and X is a monvalent cation, more particularly, potassium.

Saponification to provide a phosphonate silane according to the general formula where X is a monvalent cation can be carried out by any known technique. For example, this may be achieved by reacting the alkyl[(alkoxysilyl)alkyl)] phosphonate with water, an alkali hydroxide and an alcohol such as ethylene glycol. The extent of saponification can be adjusted by coordinating the molar ratio of the alkali hydroxide to the unsaponified phosphonate silane as well as the time and temperature used in the saponification step.

It should likewise be appreciated that addition of the unsaponified phosphonate silanes to an antifreeze concentrate will result in some saponification taking place. Such unsaponified phosphonate silanes may likewise be employed in the antifreeze concentrates of the present invention, provided that, upon addition to the antifreeze concentrate, the phosphonate silane is soluble and, also, that the "in situ" saponified phosphonate silane has an appropriate hydrophile/hydrophobe balance.

Further, it should be appreciated that, if desired, the crude phosphonate silane reaction products obtained from the particular synthesis employed can be purified, as by distillation or the like. However, any such purification may be unnecessary, may prove difficult to accomplish, or may be economically undesirable. In other words, the crude phosphonate silane reaction products, if desired, may be employed in the antifreeze compositions of the present invention. Indeed, as will be discussed hereinafter, use of the crude phosphonate silane reaction products may be more desirable, in some instances, from the performance standpoint than the purified product.

Before turning to the discussion of the hydrophile/hydrophobe balance, it should be appreciated that the active species for corrosion protection is considered to be monomeric silicate, or perhaps, silicic acid. It is accordingly believed that superior performance results and optimized efficiency may be provided by utilizing a system in which there is less opportunity for undesired and inactive high molecular weight silicate polymers to be formed.

Achieving this objective requires employing a phosphonate silane capable of efficiently stabilizing the silicate species that generates silicate monomer. An important aspect of the silicone/silicate copolymer technology is to use a silane starting material which is predominantly and preferably all monomeric in form, or if in polymeric or oligomeric form, is capable of relatively rapidly reversing to monomeric silane triol species upon addition to base and alcohol in preparing the antifreeze concentrate. Stated another way, the formation of irreversible silicone polymer reduces its stabilizing efficiency by reducing the number of silane triol and/or silanol rich molecules available for reaction with silicate and can lead to an insufficiency with the resulting formation of undesirable precipitates.

For this reason, it is desired to preferably utilize a silane starting material that is soluble in the antifreeze concentrate (e.g.—the concentrate appears clear to the naked eye). In this preferred embodiment, it is envisioned that the silane rapidly dissolves or disperses into the alcohol component so as to avoid any localized, relatively high concentration of silane that could result in undesirable polymerization more readily taking place.

Turning now to the hydrophile/hydrophobe balance considerations which must be utilized in accordance with the present invention, an understanding can perhaps best be obtained by referencing the work of others in this field. More particularly, data in U.S. Pat. No. 4,370,255 (see Example 8) suggests that the use of

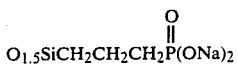

in an antifreeze provided inferior results in comparison to the alkali siliconate silylalkyl phosphonates described and claimed therein. In contrast, U.S. Pat. No. 4,629,602 states that it was surprising to find that the monoalkali metal salts of that type could be very successfully used for stabilizing silicates in view of the results shown in the '255 patent.

While one could not ascertain this understanding from these patents, the data set forth can be explained by the hydrophile/hydrophobe balance. More specifically, the disodium species described in the '255 patent was too hydrophilic, resulting in inadequate silicate stabilization, and perhaps even destabilization. In other words, while that species may have provided some silicate-stabilizing effect in the antifreeze concentrate, this may have resulted in destabilizing if used in a working antifreeze, i.e.—stability in a working antifreeze may have been less than would have been achieved without using the silane. Regardless, the data contained in the '602 patent should show improved results since the monoalkali metal salt species employed would be less hydrophilic and, thus, would be somewhat closer to an optimum hydrophile/hydrophobe balance.

Yet, what the '602 patent fails to appreciate is that the extent of saponification is only one aspect which must be taken into account. Indeed, there are situations in which the stabilizing efficiency of the monoalkali metal salt species would be inferior to that obtained using the dialkali metal salt silanes. This situation results because efficiency of stabilizing performance is dictated by the appropriateness of the hydrophile/hydrophobe balance, which balance requires a consideration of the overall molecular architecture of the phosphonate silane. Without the appropriate balance, the silane employed will possess less than satisfactory stabilizing efficiency and could even tend to destabilize the silicate in the working antifreeze.

The failure to adequately stabilize (or destabilization as well) can manifest itself in the formation of gels within an automobile cooling system. These gels can, in turn, cause blockage of the cooling system radiator tubes as well as, and importantly, result in the aggregation of silicates which render these silicates ineffective as metal corrosion inhibitors.

It is envisioned that the balance described above is necessary to provide what can be termed an adequate driving force which, in effect, increases the likelihood that the phosphonate silane will reach the silicate to then provide the desired copolymer. The result will be what may be viewed as a negatively charged silicate particle (the silicate being considered to be microcolloidal in form), which particles are thus stabilized by charge repulsion in the antifreeze concentrate.

With regard to the molecular weight considerations, too low a molecular weight phosphonate silane molecule is believed to possess a greater propensity to homopolymerize, thus depleting the stabilizer, which could result in losing control over the silicate chemistry desired. More particularly, in the absence of adequate stabilization, silicate particles grow excessively to an undesirable size. The function of stabilization is to at least minimize, and preferably eliminate, this excessive silicate particle growth as this ultimately depletes the amount of the active monomeric silicate species available in the working antifreeze. On the other hand, too high a molecular weight will provide a molecule with what may be termed undue bulk. This will tend to interfere with the kinetic equilibrium or actually produce insoluble non-equilibrium products so as to unsatisfactorily reduce the necessary solubility. In general, it is believed that the appropriate balance to provide the desired driving force will be fortuitous in that achieving this appropriate balance will likewise result in an appropriate molecular weight for both the phosphonate silane stabilizer and the resulting silicone/silicate copolymer.

Stated another way, unduly short chain length phosphonate silanes can be expected to produce high molecular weight homopolymers, which homopolymers are less effective silicate stabilizers. In contrast, longer chain length phosphonate silanes have an inherent bulkiness that limits the degree of homopolymerization. However, with phosphonate silanes of undue chain length or undue bulkiness, where homopolymerization may be minimal, undesirable silicate copolymer precipitation in the working antifreeze becomes a major concern. It should also be appreciated that the chain length of the phosphonate silane, i.e.—the relative bulkiness of the molecule, will affect the ease of saponification or hydrolysis. More particularly, the longer chain phosphonate silanes will require more rigorous saponification. In other words, it would be expected that a phosphonate silane having a chain of 24 methylene units would require more vigorous saponification to achieve the same degree of saponification than would be required with a similar silane which had a methylene chain of only two units.

A determination that the appropriate hydrophile/hydrophobe balance has been achieved can be made in a straightforward manner. Specifically, the phosphonate silane can be tested in a "boiling beaker test" which is considered to simulate or approximate the conditions experienced by an antifreeze in an automobile under operating conditions. This test procedure involves placing 100 ml. of the antifreeze concentrate into a 300 ml. Pyrex beaker and adding 100 ml. of deionized water to the beaker. The beaker is then fitted with a watch cover glass and magnetic stirrer. The aqueous antifreeze in the beaker is then heated to boiling at 108° C. for one hour. The aqueous antifreeze is then cooled to room temperature; and the resulting precipitate is washed with deionized water, and dried to constant weight in an oven at 100° C. The weight of the dried precipitate is reported as milligrams of solids.

It is, of course, most preferred that essentially no precipitate be formed in the boiling beaker test. Performance of that level should provide a highly stable antifreeze. Accordingly, use of the most preferred embodiment of the present invention from the standpoint of performance should result in less than about 10 mg. precipitate being formed However, phosphonate silanes which result in less than about 60 mg. precipitate, and even about 100 mg. precipitate or less, should be considered to have an appropriate hydrophile/hydrophobe balance. Levels of this sort can be contrasted to results obtained using phosphonates of the type set forth in U.S. Pat. No. 4,370,255, the use of which can result in a precipitate of several hundred milligrams.

Based upon test results obtained, saponifying a phosphonate silane of the structure:

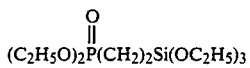

provides, after purification by distillation, a molecule having only a marginally acceptable hydrophile/hydrophobe balance, viz.—the precipitate level obtained was in the range of about 80 to about 120 milligrams. This was true whether only about one of the ethoxy groups attached to phosphorus was saponified or whether more extensive saponification was carried out. These results demonstrate the relatively powerful hydrophilic nature of the phosphonate moiety.

Accordingly, with these results in mind, the molecular architecture of the phosphonate silanes may be tailored as desired to provide a more appropriate hydrophile/hydrophobe balance. Utilizing the two methylene unit phosphonate silanes which were tested, improvement in the balance can be obtained by transesterifying one of the ethoxy groups attached to phosphorous with a longer chain moiety which will impart increased hydrophobicity and/or will be hydrolytically resistant upon saponification. The less hydrolytically resistant ethoxy group present can then be saponified.

Considering the general formula previously set forth for useful phosphonate silanes, obtaining a more appropriate hydrophile/hydrophobe balance requires that the overall molecular architecture be coordinated. More specifically, it would be desirable to utilize for $R^2$ a methylene chain length of about 6 units or more. The relative hydrophobe character can further be increased by, if present, the moieties selected for $R^1$ and $R^3$. The relative hydrophobe character is then balanced against the hydrophile character provided by the degree of saponification carried out, with more saponification being necessary as the hydrophobe character of the other portion of the molecule is increased.

As previously noted, it is often acceptable to carry out the saponification in situ, which occurs upon addition of the phosphonate silane to the antifreeze concentrate. However, it should be appreciated that this would be inappropriate in any situation in which the degree of in situ saponification is inadequate to appropriately balance the hydrophobe character of the silane.

It should also be appreciated that an appropriate balance can be obtained by using a mixture of two or more phosphonate silanes, one or more of which may not by itself have an appropriate hydrophile/hydrophobe balance. More particularly, as was previously noted, the use of the two methylene unit phosphonate silane described provided only a marginally satisfactory balance in view of the test results obtained.

However, substantially improved performance was obtained when the crude reaction product (not distilled) was utilized. This improved performance is believed due to the presence of by-products having more of a hydrophobe character, which by-products are at least largely removed upon purification. This fortuitous circumstance makes it obviously desirable to utilize the crude reaction product in this instance.

Further, and according to one aspect of the present invention, it may be desirable in some situations to employ the phosphonate silanes in a glycolized ester form. This would be particularly useful in situations where increased dispersibility in the antifreeze concentrate is desirable due to the relative hydrophobe character of the particular phosphonate silane.

Additionally, the use of the glycolized form may be desirable to minimize potential homopolymerization of the phosphonate silane where such silane has less than optimum bulkiness. As an example, it is believed that the glycolized form would be useful when employing the two methylene unit phosphonate silane previously described.

The procedure to obtain the glycolized form may be any of the procedures known for transesterification. For example, it would be suitable to react the phosphonate silane with ethylene glycol, an alkali metal hydroxide, and water in the presence of a suitable catalyst such as, for example, paratoluene sulfonic acid.

Antifreeze Concentrate and Working Antifreeze

The antifreeze concentrates may contain a limited amount of water, e.g., about 0.1 to about 10 percent by weight of water, based upon the weight of the concentrate. The water present may be inherent in the commercial grade alcohol often used in the preparation of an antifreeze concentrate or could be contained in the buffer or other components utilized.

A working antifreeze, as referred to herein, will usually contain at least about 20 volume percent water, based upon the total weight of the antifreeze. In general, to provide the working antifreeze, the antifreeze concentrate is diluted by addition of from about 25 to about 90 percent by weight of water, based upon the weight of the concentrate, to form the corrosion-inhibitive heat transfer composition suitable for introduction into internal combustion engine cooling systems.

Alternatively, if desired, the concentrate (which may be anhydrous) can be utilized as the functional fluid or working antifreeze. More particularly, while it is the current practice to dilute an antifreeze concentrate with water to form the working antifreeze, this is not considered essential.

Still further, it should be appreciated that it is within the scope of the present invention to, in effect, form the antifreeze composition in situ by adding one or more of the components directly into the engine cooling system rather then initially forming a concentrate. Indeed, while not preferred, some utility may be imparted by adding a useful copolymer of silicate and phosphonate silane into a cooling system already containing the other components.

Optional Components

The antifreeze compositions of the present invention may be employed for internal combustion engine cooling systems for any of the metals typically used or contemplated. At present, many cooling systems are what may be termed "hybrid" systems, having, in addition to ferrous surfaces, other metal surfaces such as aluminum or the like. The antifreeze compositions of this invention may be utilized in such hybrid systems as well as, of course, in an essentially ferrous system.

In hybrid and largely ferrous systems, less than optimum corrosion resistance for iron and other non-aluminum metal surfaces is occasionally encountered in the practice of the present invention as is likewise the case with state-of-the-art antifreeze compositions. It is accordingly preferred to utilize in such systems supplementary corrosion inhibitors for the particular metal surfaces involved. A wide variety of such additives are known and may be employed.

Moreover, irrespective of the type of metal surfaces in the particular cooling system, such supplementary inhibitors and other optional additives may desirably be included. In any case, these should be employed in a minor amount, up to about 50 weight percent of the antifreeze concentrate, preferably less than about 10 weight percent.

Typical optional additives include, for example, known corrosion inhibitors for metals such as, for example, molybdates, tungstates, selenates, chromates, borates, organophosphates, carbonates and bicarbonates, sebacates and other dicarboxylic acids, benzoates, hydroxy benzoates or acids thereof, acrylic acid polymers and graft copolymers thereof, silicones, alkali metal nitrates, alkali metal nitrites, tolyltriazole (hereinafter "TTZ"), mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide a measurable extent of corrosion inhibition with respect to the cooling system metal surfaces to be protected.

Other typical optional additives that may be employed include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the antifreeze art.

Performance of the Antifreeze Concentrates

The antifreeze concentrates of the present invention are characterized by satisfactory stability against gelation prior to usage. Upon dilution to provide a working antifreeze, utilization of the antifreeze concentrates of this invention are characterized by exceptional resistance to gelation as well as freedom from undesirable precipitates. The relative amount of active monomeric silicate available should likewise be capable of being maximized. In other words, the improved stability resulting from the use of the present invention should provide the ability, particularly in its preferred embodiments, to substantially reduce, and perhaps even essentially eliminate, the formation of inactive, polymeric silica.

When optional corrosion inhibitors of an ionic nature are employed in the formulation, the present invention affords further advantages over conventional antifreezes. Thus, the inclusion of such optional inhibitors, particularly at the lower pH levels, tends to exacerbate the solubility and stability considerations of the system. The antifreeze composition of the present invention, imparting superior stability in the working antifreeze, provides a less sensitive and more efficient system. Indeed, the enhanced stability provided should allow greater latitude in formulation than has heretofore been possible.

The following Examples are merely illustrative of, and are not intended to limit, the present invention.

EXAMPLE 1
(Control)

This Example illustrates the preparation of

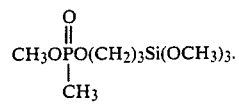

The preparation was carried out according to the method described in Example 1 of U.S. Pat. No. 4,093,641.

400 grams (2.02 moles) of $3\text{-ClC}_3\text{H}_6\text{Si}(\text{OCH}_3)_3$ were reacted with 250 grams (2.02 moles) of

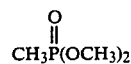

in the presence of 2 grams of $N(n\text{—}C_4H_9)_3$ catalyst. The resulting product crude was flash distilled at reduced pressure to obtain the following four cuts: Cut 1 —all low boiling unreacted starting materials distilling to about 46° C. at 0.5 mm. mercury pressure [80 grams]; Cut 2 —phosphonate silane boiling in the range of about 110°±20° C. at about 0.2 mm. of mercury pressure [239.4 grams]; Cut 3 —phosphonate silane boiling in the range of 160°±20° C. at about 0.1 mm. of mercury pressure [109.2 grams]; and Cut 4 —undistilled phosphonate silane residue to a pot temperature of 248? C. at about 0.1 mm. of mercury pressure.

Carbon 13, Silicon 29 and Phosphorous 31 Nuclear Magnetic Resonance analysis of Cut 2 indicated the following mixture of phosphonate species:

| | |
|---|---|
| $\overset{O}{\underset{\|}{CH_3\overset{\|}{P}(OCH_3)_2}}$ | 7.6 mole % |
| $\overset{O}{\underset{\|}{CH_3O\overset{\|}{P}(CH_2)_3Si(OCH_3)_3}}$ <br> $\phantom{CH_3O\|}CH_3$ | 81.4 mole % |
| $\overset{O}{\underset{\|}{[(CH_3O)_3Si(CH_2)_3O]_2\overset{\|}{P}CH_3}}$ | 4.1 mole % |
| $\overset{O}{\underset{\|}{[CH_3\overset{\|}{P}OCH_3]_2O}}$ | 1.5 mole % |
| $\overset{O}{\underset{\|}{[(CH_3O)_3Si(CH_2)_3O\overset{\|}{P}CH_3]_2O}}$ | 5.4 mole % |

Silicon 29 and Carbon 13 NMR analysis also confirmed the presence of 16 mole % of

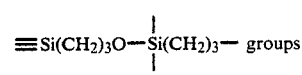

in the Cut 2 product mixture.

EXAMPLE 2
(Control)

This Example illustrates an attempt to saponify the

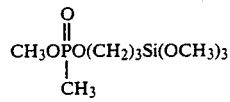

obtained in Example 1.

Into a 250 ml., 3-necked flask equipped with an electric heating mantle, thermometer, magnetic stirrer, dropping funnel and distillation head with receiver, was charged 87.2 grams of water and 26.4 grams (0.4 moles) of potassium hydroxide pellets (85% purity). After stirring to dissolve at 60°-65° C., 54.4 grams (0.16 moles) of 81.4 mole % pure

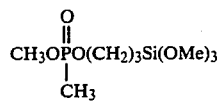

prepared in Example 1 (Cut 2) was added in a dropwise fashion over a period of time of about 5 minutes. Ethylene glycol, 42.9 grams, was then added; and the stirred mixture was heated for about 1 hour to distill over 96 grams methanol and water to a final pot temperature of 115° C. Redilution with 96 grams of water and a facile filtration through a glass frit filter-funnel produced 210.3 grams of saponified phosphonate silane, equivalent to a 25.8 wt. % solution of the silane produced in Example 1 (Cut 2).

The product was then analyzed by Carbon 13, Silicon 29, and Phosphorous 31 NMR. Product analysis showed no CH$_3$O— groups left on the silicon atom, the methyl group still bonded to the phosphorous atom and 22 mole % of residual methoxy-phosphonate group along with 88 mole % of silylpropoxy-phosphonate. Further, $^{13}$C NMR indicated a 40/60 mole percent ratio of

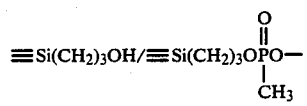

versus the 16/84 mole percent ratio of related structure

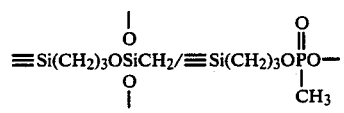

in the starting material from Example 1 (Cut 2).

This lack of selectivity during saponification of the phosphonate diester groups was further indicated by $^{29}$Si NMR, which showed the following mixture of silane functionalities:

| | |
|---|---|
| Si(OH)$_3$ | 37.8 mole % |
| Si(OH)$_x$(OR')$_{2-x}$(O½) | 52.5 mole % |
| (where - OR' = —O(CH$_2$)$_3$Si≡ | 9.7 mole % |
| Si(OH)(O½)$_2$ | |

The $^{31}$P NMR analysis showed supporting evidence in the corresponding 27/73 mole percent ratio of

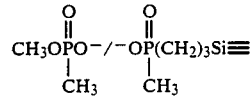

versus the 9/91 (potential) mole percent ratio in the starting material from Example 1 (Cut 2).

EXAMPLE 3

This Example illustrates the preparation of

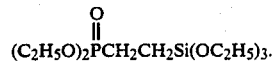

Into a 1-liter, 3-necked flask equipped with thermometer, electric heating mantle, magnetic stirrer assembly and 1-foot long, 1-inch diameter Vigreaux column outfitted for distillation with a head, fraction cutter and receiver, was charged 250.3 grams (1.81 moles) of diethyl phosphite. The latter was heated with stirring and held at 135° C. while 344.45 grams (1.81 moles) of vinyltriethoxysilane was added by means of a dropping funnel at the rate of about 2.0 ml./minute. Benzoyl peroxide, 3.62 grams, 1.05 wt. % on silane, was predissolved in the vinyltriethoxysilane before the addition was made. After the addition, the reaction mixture was heated to 150° C. for 1 hour. The reaction mixture was thereafter stripped of unreacted starting materials and distilled.

A fraction weighing 267.5 grams was obtained, the fraction having a boiling point of 105° C. at 1.1 mm. of mercury pressure. The fraction represented 0.815 moles of 99% pure diethyl[β-(triethoxysilyl)ethyl]phosphonate.

EXAMPLE 4

This Example shows the preparation of saponified diethyl[β-(triethoxysilyl)ethyl]phosphonate using a 4:1 mole ratio of potassium hydroxide to the silane.

Into a 250 ml., 3-necked flask equipped with electric heating mantle, thermometer, magnetic stirrer, dropping funnel, and distillation head with receiver, was charged 66.2 grams of water and 43.56 grams (0.66 moles) of potassium hydroxide pellets (85% purity). After stirring to dissolve at 60°-65° C., 54.25 grams (0.165 moles) of the 99% pure phosphonate silane produced in Example 3 was added over a period of about 3 minutes. Ethylene glycol, 46.5 grams, was then added; and the stirred mixture was heated to distill over ethanol and water to a final pot temperature of 150° C. Over a period of 2 hours, the reaction mixture was refluxed at 123°±2° C., with periodic water addition to maintain the latter reaction temperature.

Upon cooling, 71.2 grams of water was added to obtain 210.3 grams of saponified phosphonate silane equivalent to a 25.8 wt. % solution of the silane produced in Example 3:

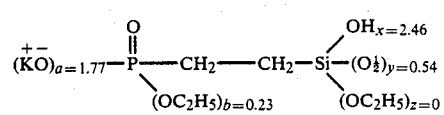

NMR analysis showed no cleavage of P—C—C—Si bonds, no residual ethoxy groups on silicon and less than 12 mole percent of residual ethoxy groups on phosphorous. Additionally, $^{29}$Si NMR showed that the following mixture of silane functional moieties comprised the saponified silicon hydrolyzate:

| | |
|---|---|
| CH$_2$Si(OH)$_3$ | 51.4 mole % |
| CH$_2$Si(OH)$_2$O$\frac{1}{2}$ | 42.8 mole % |
| CH$_2$SiOH(O$\frac{1}{2}$)$_2$ | 5.8 mole % |
| CH$_2$Si(O$\frac{1}{2}$)$_3$ | 0.0 mole % |

EXAMPLE 5

This Example illustrates the preparation of a saponified derivative of diethyl[β-(triethoxysilyl)ethyl]phosphonate employing about a 1.5:1 mole ratio of potassium hydroxide to the silane.

Into the 1-liter, 3-necked flask described in Example 4, was charged 150.9 grams of water, 105.8 grams of ethylene glycol and 31.1 grams of 85% potassium hydroxide pellets (15% water). To this stirred mixture was added 100 grams (0.3 moles) of the 99% pure silane produced in Example 3. A mixture of ethanol and water, 83 grams, was distilled out to a final pot temperature of about 110° C. over about 3 hours. Water, 83 grams, was added to restore the original 25.8 wt. % concentration of the phosphonate silane.

NMR analysis showed no cleavage of the P—C—C—Si bonds, no residual ethoxy groups on silicon and 60 mole percent of ethoxy group still present on phosphorous. Additionally, $^{29}$Si NMR showed that the following mixture of silane functional moieties comprise the saponified silicone hydrolyzate:

| | |
|---|---|
| —CH$_2$Si(OH)$_3$ | 14.8 mole % |
| —CH$_2$Si(OH)$_2$O$\frac{1}{2}$ | 33.4 mole % |
| —CH$_2$SiOH(O$\frac{1}{2}$)$_2$ | 40.7 mole % |
| —CH$_2$Si(O$\frac{1}{2}$)$_3$ | 11.1 mole % |

EXAMPLE 6

This Example illustrates the preparation of

Utilizing essentially the same equipment set up as described in Example 3, C$_6$H$_{11}$Si(OC$_2$H$_5$)$_3$, 150 grams (0.609 moles), was reacted with 84.1 grams (0.609 moles) of diethyl phosphite and 7 grams, 3.0 wt. %, of di-tert-butyl peroxide in a manner similar to the reaction described in Example 3.

The intermediate, C$_6$H$_{11}$Si(OC$_2$H$_5$)$_3$, was produced by conventional platinum-catalyzed hydrosilation of a 50 mole percent excess of 1,5-hexadiene with HSiCl$_3$, and subsequent ethanol esterification of isomeric C$_6$H$_{11}$SiCl$_3$ adducts to obtain a 70+ mole percent yield of the corresponding C$_6$H$_{11}$Si(OC$_2$H$_5$)$_3$ olefin derivatives.

$^{13}$C NMR analysis showed the following component mixture:

| Component | Mole % |
|---|---|
| CH$_2$=CH(CH$_2$)$_4$Si(OC$_2$H$_5$)$_3$ | 62.0 |
| trans/cis = 1.19 CH$_3$CH=CH(CH$_2$)$_3$Si(OC$_2$H$_5$)$_3$ | 27.6 |
| CH$_2$=CH(CH$_2$)$_2$CH(Si(OC$_2$H$_5$)$_3$)CH$_3$ | 9.0 |
| CH$_3$CH=CHCH$_2$CH(Si(OC$_2$H$_5$)$_3$)CH$_3$ | 1.4 |

The phosphonate silane product, boiling at about 125°±5° C. at 1.0 mm. of mercury pressure, was obtained in a 82 mole percent yield. $^{31}$P NMR showed the following mixture of isomeric phosphonates:

| | Mole % |
|---|---|
| (CH$_2$H$_5$O)$_2$P(O)(CH$_2$)$_6$Si(OC$_2$H$_5$)$_3$ | 52.4 |
| CH$_3$CH(CH$_2$)$_4$Si(OC$_2$H$_5$)$_3$ with P(O)(OC$_2$H$_5$)$_2$ branch | 28.7 |
| CH$_3$CH$_2$CH(CH$_2$)$_3$Si(OC$_2$H$_5$)$_3$ with P(O)(OC$_2$H$_5$)$_2$ branch | 18.9 |

EXAMPLE 7

This Example illustrates the preparation of spaonified, isomeric diethyl[triethoxysilylhexyl]phosponate.

The following mixture was placed in a flask equipped with a loosely-fitted cover: 30 grams of the product from Example 6, 40.95 grams of water, 20.47 grams ethylene glycol and 24.86 grams of 88% potassium hydroxide (providing a mole ratio to the silane of 5:1). The flask was then placed in an oven heated to 100° C. for about 72 hours.

At the end of this time, the flask was removed from the oven; and water was added in an amount sufficient to produce a 25.8 wt. % active solution (the same wt. % that was placed into the oven originally). 116.28 grams of the solution were obtained.

EXAMPLE 8

This Example shows the difference in silicate stabilization capacity of a phosphonate silane in accordance with the present invention in comparison to a conventionally used silane as well as the effect of saponification in an aluminum disc test with a cold finger.

A standard test method used in the antifreeze industry was employed to determine the inhibitory effect of the formulated antifreeze compositions using various silicones with respect to heat rejecting aluminum surfaces. This test method is described in *Corrosion*, 15,257t at 258t (1959) "Laboratory Methods for Determining Corrosion Rates Under Heat Flux Conditions", and also in an ASTM publication entitled, "Engine Coolant Testing: State of the Art," a symposium sponsored by ASTM Committee incorporated herein by reference.

The following summarizes the test equipment and procedure used:

The apparatus consisted of a one liter flask, fitted with a condenser, a thermometer, a cold finger, a temperature controller, a 1½ inch diameter×¼ inch thick no. 319 aluminum casting ally (herein the "aluminum disc"), and a soldering iron heat source.

The apparatus was charged with 900 ml. of the water-diluted antifreeze solution (1 volume/3 volume antifreeze/water) and heated to effect boiling at the aluminum disc surface and to maintain a solution temperature of about 80° C. Each water-diluted antifreeze test prepared by adding the silane to the base fluid, identified in Table I below:

TABLE I

| Ingredients | Wt. % |
|---|---|
| Ethylene Glycol | 93.6780 |
| $Na_4B_4O_7 \cdot 5H_2O$ | 3.7522 |
| NaOH, 50% soln | 1.4870 |
| Nasil, 40 clear* | 0.3663 |
| Test silane | 0.1000 |
| NaTTZ, 50% soln | 0.1665 |
| $NaNO_3$, 50% soln | 0.5000 |
| | 100.0000 |
| pH, 33% soln | 8.88 |
| RA, 10% soln (ASTM) | 51.6 |

*A liquid sodium silicate product of Diamond Shamrock Corporation having a solids content of 38.3 wt. % and manufactured for uses requiring high clarity.

Table II shows the results of the test:

TABLE II

| Test No. | Test Silane | Mg. CFD* | Mg Al Wt. Loss |
|---|---|---|---|
| A | $(C_2H_5O)_2\overset{O}{\overset{\|}{P}}CH_2CH_2Si(OC_2H_5)_3$ | 57 | 6 |
| B | $(C_2H_5O)_2\overset{O}{\overset{\|}{P}}CH_2CH_2Si(OC_2H_5)_3$ Sap** | 6 | 1 |
| C | $CH_3O(CH_2CH_2O)_{7.2}C_3H_6Si(OCH_3)_3$ | 77 | 6 |
| D | $CH_3O(CH_2CH_2O)_{7.2}C_3H_6Si(OCH_3)_3$ Sap** | 93 | 2 |

*"CFD" denotes cold finger deposit.
**"Sap" denotes saponification.

In Test No. B, the test silane was a distilled material similar to that described in Example 3 and was saponified using 1.5 moles potassium hydroxide per 1 mole of the silane. The test silane used in Test No. D was saponified with that same molar ratio. The procedure employed for saponification was as is described in Example 4.

As can be seen from Table II, the saponified phosphonate silane of the present invention does not destabilize the silicate in the 33% aqueous solution. In contrast, both the saponified and unsaponified version of the prior art silane destabilize the silicate in the same environment.

Table III shows the results from a series of aluminum disc tests wherein the silanes are compared on an equivalent silicon basis, the silane used in Test No. F being the crude product (similar to the reaction product mixture obtained in Example 3 prior to distillation) saponified with potassium hydroxide using a 1.5:1 mole ratio of the potassium hydroxide to the silane:

TABLE III

Silane Effects at Equivalent Si Concentrations

| Test No. | Test Fluid | Silane | Mg. CFD |
|---|---|---|---|
| E | 1 | $CH_3O(CH_2CH_2O)_{7.2}C_3H_6Si(OCH_3)_3$ | 172 |
| F | 2 | $(C_2H_5O)_2\overset{O}{\overset{\|}{P}}CH_2CH_2Si(OC_2H_5)_3$ Sap | 24 |

Table IV sets forth the composition of Test Fluid nos. 1 and 2:

TABLE IV

| | Wt. % | |
|---|---|---|
| | Test Fluid No. 1 | Test Fluid No. 2 |
| Ingredients | | |
| Ethylene Glycol | 93.4362 | 93.3742 |
| $Na_4B_4O_7 \cdot 5H_2O$ | 3.7200 | 3.7200 |
| NaOH - 50% | 1.4745 | 1.4745 |
| Nasil - 40 Clear | 0.3663 | 0.3663 |
| DI Water | 0.2000 | 0.2000 |
| Silane Used in Test No. E | 0.1000 | 0.1000 |
| Silane Used in Test No. F | — | 0.1620 |
| $NaNO_3$ - 40% | 0.5000 | 0.5000 |
| NaTTZ - 50% | 0.2330 | 0.2330 |
| Properties | | |
| pH (conc) | 7.2 | 7.1 |
| 50% | 8.6 | 8.7 |
| 33% | 8.9 | 8.9 |
| RA (ASTM) | 51.78 | 50.90 |
| ppm organic Si | 45.2 | 45.2 |

Table V sets forth data from a series of ASTM D-1384 Glassware Corrosion Tests serving to demonstrate that antifreeze formulations containing the phosphonate silanes of the present invention will protect metals as well as the conventional formulas using a conventionally employed silane:

TABLE V

| | | | Wt. Loss: Mg/4 Sq. In. | | | | | |
|---|---|---|---|---|---|---|---|---|
| Test No. | Test Fluid No. | Silicone | Hi-Pb Solder | Cu | ASTM Solder | Br | St | C—Fe | C—Al |
| G | 1 | Silane Used in Test No. E | 20 | 3 | 4 | 3 | 2 | 1 | 2 |
| H | 1 | Silane Used in Test No. E | 21 | 3 | 2 | 3 | 1 | 1 | 5 |
| I | 2 | Silane Used in Test No. F | 23 | 3 | 3 | 2 | 1 | 0 | 1 |
| J | 2 | Silane Used in Test No. F | 19 | 3 | 4 | 3 | 2 | 1 | 4 |

We claim:
1. An antifreeze having a selected pH comprising:
(a) an alcohol;
(b) a buffer in an amount to maintain said pH for the antifreeze;
(c) a silicate in a corrosion-inhibiting amount; and
(d) a phosphonate silane having the formula:

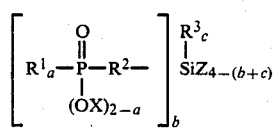

wherein a is 0 or 1, b is 1 or 2, c is 0 or 1, $R^1$ and $R^3$ are selected from the group consisting of hydrogen, monovalent hydrocarbon radicals and substituted monovalent hydrocarbon radicals and selected so as not to render the silane, its hydrolyzate or the copolymer of the phosphonate silane and silicate insoluble in the antifreeze, $R^2$ is a divalent hydrocarbon radical selected from the group consisting of alkylene having from 1 to about 36 carbon atoms, arylene and alicyclic radicals, Z is a hydrolyzable moiety attached to silicon, and X is a member selected from the group consisting of hydrogen, monovalent hydrocarbon radicals, substituted monovalent hydrocarbon radicals, and a monovalent cation, said phosphonate silane having an appropriate hydrophile/hydrophobe balance and being present in an amount sufficient to stabilize the silicate.

2. The antifreeze of claim 1 wherein b is 1 and c is 0.
3. The antifreeze of claim 2 wherein $R^2$ is $(CH_2)_2$.
4. The antifreeze of claim 2 wherein $R^2$ is $(CH_2)_3$.
5. The antifreeze of claim 1 wherein component (c) is an inorganic silicate described as a distribution of species represented by units having the empirical formula:

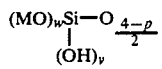

wherein M is a monovalent cation that forms a glycol soluble silicate selected from the group consisting of sodium, potassium, lithium, rubidium and tetraorganoammonium cations, w has a value of from 1 to 4 inclusive, v has a value from 0 to 3 inclusive and p has a value from 1 to 4 inclusive which is equal to the sum of w and v.

6. The antifreeze of claim 1 wherein component (c) is an organic silicate ester having the formula:

wherein R is selected from the group consisting of alkyl, aryl, alkoxyalkyl, alkoxyaryl and mixtures thereof.

7. The antifreeze of any of claims 1 through 6 made from an antifreeze concentrate wherein the amount of component (c) is between 100 and 1000 ppm of equivalent Si based on the total weight of the antifreeze concentrate.

8. The antifreeze of any of claims 1 through 6 made from a concentrate wherein the amount of component (d) is between about 10 and about 100 ppm of silicon equivalents based on the weight of the antifreeze concentrate.

9. The antifreeze of any of claims 1 through 6 wherein said pH is between about 8 and about 11.

10. The antifreeze of any of claims 1 through 6 wherein said pH is between about 9 and about 10.5.

11. The antifreeze of any of claims 1 through 6 wherein said pH is between about 8 and about 10.5.

12. The antifreeze of any of claims 1 through 6 which additionally contains carbonate or bicarbonate, or a mixture thereof.

13. The antifreeze of any of claims 1 through 6 made from a concentrate wherein the amount of component (b) is between about 1 and about 5 wt.% based on the weight of the concentrate.

14. The antifreeze of claim 1 wherein said phosphonate silane comprises the reaction product of diethyl phosphite and vinyltriethoxysilane, saponified with potassium hydroxide.

15. The antifreeze of claim 1 wherein said phosphonate silane is added to the antifreeze in a glycolized form.

16. An antifreeze having a selected pH comprising:
(a) an alcohol;
(b) a buffer in an amount to maintain said selected pH for the antifreeze;
(c) a silicate in a corrosion-inhibiting amount; and
(d) a phosphonate silane having the formula:

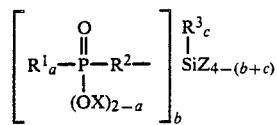

wherein a is 0 or 1, b is 1 or 2, c is 0 or 1, $R^1$ and $R^3$ are selected from the group consisting of hydrogen, monovalent monovalent hydrocarbon radicals and substituted monovalent hydrocarbon radicals and selected so as not to render the silane, its hydrolyzate or the copolymer of the silane/silicate insoluble in the antifreeze, $R^2$ is a divalent alkylene radical haivng 2 or 3 carbons, Z is a hydrolyzable moiety attached to silicon, and X is a member selected fron the group consisting of hydrogen, monovalent hydrocarbon radicals, substituted monovalent hydrocarbon radicals, and a monovalent cation, said phosphonate silane having an appropriate hydrophile/hydrophobe balance characterized by less than about 100 mg. precipitate as determined by the boiling beaker test, and being present in an amount sufficient to stabilize the silicate.

17. The antifreeze of claim 16 wherein the precipitate in the boiling beaker test is less than about 60 mg.

18. The antifreeze of claim 17 wherein the precipitate in the boiling beaker test is less than about 10 mg.

19. The antifreeze of claim 16 wherein $R^2$ is $(CH_2)_2$.

20. The antifreeze of claim 16 wherein $R^2$ is $(CH_2)_3$.

21. The antifreeze of claim 16 wherein component (c) is an inorganic silicate described as a distribution of species represented by units having the empirocal formula: wherein M is a monovalent cation that forms a glycol soluble silicate selected from the group consisting of sodium, potassium, lithium, rubidium and tetraorganoammonoium cations, w has a value of from 1 to 4 inclusive, v has a value from 0 to 3 inclusive and p has a value from 1 to 4 inclusive which is equal to the sum of w and v.

22. The antifreeze of claim 16 wherein component (c) is an organic silicate ester having the formula:

wherein R is selected from the group consisting of alkyl, aryl, alkoxyalkyl, alkoxyaryl and mixtures thereof.

23. The antifreeze of claim 16 made from an antifreeze concentrate wherein the amount of component (c) is between 100 and 1000 ppm of euqivalent Si based on the total weight of the antifreeze concentrate.

24. The antifreeze of claim 16 made from an antifreeze concentrate wherein the amount of component (d) is between about 10 and about 100 ppm of silicon equivalents based on the weight of the antifreeze concentrate.

25. The antifreeze of claim 16 wherein said selected pH is between about 8 and about 11.

26. The antifreeze of claim 25 wherein said selected pH is between about 9 and about 0.5.

27. The antifreeze of claim 6 wherein said selected pH is between about 9 and about 10.5 as measured on a 50:50 volume/volume ratio of antifreeze concentrate and water.

28. The antifreeze of claim 16 which additionally contains carbonate or bicarbonate, or a mixture thereof.

29. The antifreeze of claim 16 wherein the amount of component (b) is between about 1 and about 5 wt. % based on the weight of the concentrate.

30. The antifreeze of claim 16 wherein said phosphonate silane comprises the reaction product of diethyl phosphite and vinyltriethoxysilane, saponified with potassium hydroxide.

31. The antifreeze of claim 16 wherein said phosphonate silane is added to the antifreeze in a glycolized form wherein the phosphonate silane is transesterfied with a glycol.

32. The antifreeze of claim 31 wherein the glycol is ethylene glycol.

* * * * *

UNITED STATES PATENT AND TRADEMARK OFFICE
CERTIFICATE OF CORRECTION

PATENT NO. : 4,772,408

DATED : September 20, 1988

INVENTOR(S) : Paul H. Mohr; Enrico J. Pepe

It is certified that error appears in the above-identified patent and that said Letters Patent is hereby corrected as shown below:

Col. 1, Line 56: Delete "10 5" and replace with --10.5--.

Col. 3, Line 11: Preceding formula "(RO)" insert --(I)--.

Col. 3, Line 13: Preceding formula "[(RO)" insert --(II)--.

Col. 3, Line 15: Preceding word "mixtures" insert --(III)--.

Col. 16, Line 29: Delete "248?C" and replace with --248°C--.

Col. 24, Line 20: Remove second occurrence of "monovalent".

Col. 24, Line 25: Delete the word "haivng" and replace with --having--.

Col. 24, Line 27: Delete the word "fron" and replace with --from--.

Col. 24, Line 44: Delete word "empirocal" and replace with --empirical--.

Col. 24, Line 46: Delete following word formula: the word "wherein" and replace with --formula: $(MO)_w Si-O_{\frac{4-p}{2}}$
$(OH)_v$ --.

Col. 24, Line 49: Delete word "tetraorganoammonoium" and replace with word --tetraorganoammonium--.

Col. 24, Line 62: Delete word "euqivqlent" and replace with word --equivalent--

Col. 25, Line 6: Delete "0.5" and replace with --10.5--.

Col. 25, Line 7: Delete "claim 6" and replace with --claim 16--.

UNITED STATES PATENT AND TRADEMARK OFFICE
CERTIFICATE OF CORRECTION

PATENT NO. : 4,772,408

DATED : September 20, 1988

INVENTOR(S) : Paul H. Mohr; Enrico J. Pepe

It is certified that error appears in the above-identified patent and that said Letters Patent is hereby corrected as shown below:

Col. 25, line 7: Delete "claim 6" and replace with --claim 16--.

Signed and Sealed this

Twenty-eighth Day of August, 1990

Attest:

HARRY F. MANBECK, JR.

*Attesting Officer*   *Commissioner of Patents and Trademarks*